(12) United States Patent
Bäbler

(10) Patent No.: US 7,077,898 B2
(45) Date of Patent: Jul. 18, 2006

(54) BLACK PIGMENT COMPOSITIONS

(75) Inventor: Fridolin Bäbler, Teresópolis (BR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 29 days.

(21) Appl. No.: 10/886,487

(22) Filed: Jul. 7, 2004

(65) Prior Publication Data

US 2005/0014863 A1    Jan. 20, 2005

Related U.S. Application Data

(60) Provisional application No. 60/488,156, filed on Jul. 17, 2003.

(51) Int. Cl.
| C09C 1/48 | (2006.01) |
| C09C 3/00 | (2006.01) |
| C09C 3/08 | (2006.01) |
| C09B 67/20 | (2006.01) |

(52) U.S. Cl. ............... 106/476; 106/472; 106/473; 106/474

(58) Field of Classification Search ........ 106/472, 106/473, 474, 476
See application file for complete search history.

(56) References Cited

U.S. PATENT DOCUMENTS

| 3,386,843 | A | | 6/1968 | Jaffe et al. .............. 106/288 |
| 4,250,079 | A | | 2/1981 | Bäbler .................... 260/42.21 |
| 4,762,569 | A | | 8/1988 | Miki et al. ............... 106/476 |
| 5,334,727 | A | * | 8/1994 | Campbell ............... 548/373.1 |
| 5,601,914 | A | | 2/1997 | Yabuno et al. .......... 428/323 |
| 5,868,828 | A | * | 2/1999 | Badejo et al. .......... 106/497 |
| 5,922,118 | A | | 7/1999 | Johnson et al. ......... 106/31.6 |
| 5,962,574 | A | | 10/1999 | Jackson et al. ......... 524/495 |
| 6,010,567 | A | | 1/2000 | Schädeli et al. ........ 106/413 |
| 6,225,472 | B1 | * | 5/2001 | Babler .................... 546/49 |
| 6,235,106 | B1 | | 5/2001 | Loucka et al. .......... 106/453 |
| 6,264,733 | B1 | * | 7/2001 | Babler .................... 106/495 |

FOREIGN PATENT DOCUMENTS

| DE | 2451780 | 2/1976 |
| EP | 0023318 | 2/1981 |
| EP | 0 302 973 | 2/1989 |
| JP | 2002-201377 A | * 7/2002 |
| JP | 2003-253151 A | * 9/2003 |
| WO | 99/51690 | 10/1999 |

OTHER PUBLICATIONS

English language abstract for JP 4065279, (Mar. 1992).
English language abstract for JP 1074277, (Mar. 1989).
English language abstract for JP 10104599, (Apr. 1998).
English language abstract for EP 0023318, (Feb. 1981).
Derwent Abst. 2003-591562 of JP 2003 171594, (Jun. 2003).
Derwent Abst. 2001-658587 of JP 2001 172530, (Jun. 2001).
Derwent Abst. 1989-313707 of JP 01 232524 (Sep. 1989).
Derwent Abst. 1989-204346 of JP 01 144476, (Jun. 1989).
Derwent Abst. 1989-204345 of JP 01 144475, (Jun. 1989).
Derwent Abst. 1983-812055 of JP 58 167654, (Oct. 1983).
Derwent Abst. 1984-309337 of JP 59 193125, (Nov. 1984).

* cited by examiner

*Primary Examiner*—Anthony J. Green
(74) *Attorney, Agent, or Firm*—Shiela A. Loggins

(57) ABSTRACT

The present invention relates to black pigment compositions comprising
(a) carbon black, and
(b) a compound of the formula $$(MO_3S)_m\text{-}Q\text{-}[(CH_2)_k\text{-}X]_n, \quad (I)$$

wherein
Q is a pigment or pigment intermediate radical selected from the group of anthraquinone, perinone, perylene, diketopyrrolopyrrole, thioindigo, iminoisoindoline, iminoisoindolinone, quinacridone, 6,13-dihydroquinacridone, flavanthrone, dioxazine, indanthrone, anthrapyrimidine and quinophthalone,
X is a cyclo hetero aliphatic group with at least one 5 or 6 atom ring or a hetero aromatic group with at least one 6 atom ring,
M is hydrogen, a metal cation or nitrogen cation,
k is 0 or 1, and
m and n are each independently of the other from 0 to 4, wherein 0 and 4 are not simultaneously 0.

Compositions are useful for coloring high molecular weight material, like inks, plastics and in particular automotive coatings.

26 Claims, No Drawings

BLACK PIGMENT COMPOSITIONS

This application claims the benefit of U.S. Provisional Application No. 60/488,156 filed Jul. 17, 2003.

SUMMARY

The present invention relates to black pigment compositions and a method of using the black compositions to color various substrates, such as high molecular weight material.

BACKGROUND OF THE INVENTION

Carbon black is used in large quantities for the coloration and pigmentation of many substrates due to its strong color and relatively low cost. Carbon black can be produced by a number of different processes, for example, furnace black-, channel black-, gas black- or other thermal oxidative processes.

Such carbon black products are often tailor made for specific applications like plastics, automotive solvent or waterborne based paints or inks. These products can be lacking in ease of dispersibility. Furthermore, these products show a strong absorption in the near IR region. Thus, articles colored by carbon black heat up quickly when exposed to sunlight, which is particularly problematic when used in car upholstery.

Another major drawback of carbon black is its color characteristics when used in different concentrations or in particular in combination with other organic, inorganic or effect pigments. Carbon black often tends to shift to an undesirable brownish hue. Thus, its use for certain color styling is limited.

Black colored cars are popular worldwide. They are painted mainly with carbon black pigments. The main drawbacks of such pigments are their high viscosity and often poor gloss behavior.

Black organic pigments are known. For example, German Patent No. 2,451,780 describes N-substituted perylene tetracarboxylic acid diimides as black pigments for paints, plastics and inks.

Many patents also describe the use of pigment mixtures for the creation of black colorations. For example, U.S. Pat. No. 6,235,106 describes blue shade black pigment compositions useful in paints, inks and plastics, comprising a mixture of iron oxide, chromium oxide and manganese oxide. The iron oxide primarily contains yellow iron oxide while the manganese oxide contributes to the strength and blueness of the pigment.

Published Japanese Patent No. 04-065,279 A2 describes lightfast black ink ribbons that are prepared from inks containing multiple light-resistant organic pigments. One such ink contains C.I. Pigment Yellow 123, C.I. Pigment Red 88, and C.I. Pigment Blue 15:6.

Published Japanese Patent No. 01-074,277 describes a method of toning carbon black containing inks to reduce their reddish tint by mixing them with Cu phthalocyanine pigments obtained by treating phthalic acid and/or its derivatives, urea, and Cu or its compounds in organic solvents in the presence of catalysts and benzophenone-3,3',4,4'-tetracarboxylic acid, its anhydride, or imides.

Published Japanese Patent No. 10-104,599A describes a method for coloring resin compositions for forming shading film for liquid crystal displays—consisting of a combination of organic pigments having the color yellow, blue and purple or the combination of organic pigments with yellow, red and blue color.

U.S. Pat. No. 5,540,998 describes colorant compositions containing at least two of 1) a red pigment, 2) an orange pigment, 3) a yellow pigment, 4) a green pigment, 5) a blue pigment and 6) a violet pigment. Each of the pigments must exhibit a particular reflectance. The colorant composition is described as being an achromatic black formed by additive mixing. An additive mixture of Pigment Green 7, Pigment Yellow 154 and Pigment Violet 19 is exemplified in Table 1.

U.S. Pat. No. 6,010,567 describes black-pigmented structured high molecular weight material for black matrixes for optical color filters. The patent relates to a black-pigmented high molecular weight organic material that is structured from a radiation-sensitive precursor by irradiation. The pigmentation consists of colored organic pigments, at least one of which is in latent form before irradiation.

European Patent Application No. 23,318 describes gray to black colored thermoplastic film for laminated identity cards, containing white pigment and/or filler and a gray mixture of colored organic pigments. The film is specified for the production of laminates for identity, checks or credit cards. It has an inconspicuous appearance and strong covering power, making it especially useful for purposes where forgery needs to be made difficult, but is easily detected. Preferred materials are (A) Sb oxide, kaolin, silica, chalk, Ba sulphate, Ti dioxide and ZnS; (B) mixtures of red and green pigments in 6–12:10 weight ratio; violet and green in 5–15:10 weight ratio; and violet, yellow and blue in 20 to 30:10 to 50:60 to 10 weight ratios.

Other patents describe the surface treatment of carbon black to improve the pigment properties for application in coatings and inks.

For example U.S. Pat. No. 5,922,118 describes ink jet compositions comprising an aqueous vehicle and a modified colored pigment comprising colored pigment having attached at least one organic group, the organic group comprising a) at least one aromatic group or a $C_1$–$C_{12}$alkyl group, and b) at least one ionic group, at least one ionizable group, or a mixture of an ionic group and an ionizable group, wherein the at least one aromatic group or $C_1$–$C_{12}$alkyl group of the organic group is directly attached to the colored pigment and the organic group is present at a treatment level of from about 0.10 to about 4.0 micromoles/$m^2$ of the colored pigment used, based on the nitrogen surface area of the colored pigment, wherein said colored pigment comprises carbon, anthraquinones, phthalocyanine blues, phthalocyanine greens, diazos, monoazos, pyranthrones, perylenes, heterocyclic yellows, quinacridones, (thio)indigoids and mixtures thereof. Such modified carbon products have better pigment properties when applied in ink jet systems, but they require sophisticated preparation procedures and therefore are uneconomical.

U.S. Pat. No. 5,962,574 describes a primer coating composition capable of protecting a substrate susceptible to degradation by ultraviolet light, said composition serving as a primary coat on said substrate beneath a multi layer color base coat/clear top coat finish. The UV light blocking pigments used are carbon black pigments surface modified with pigment derivative codispersant along with polymer dispersant. The pigment co-dispersant is a copper phthalocyanine derivative such as sulfonated copper phthalocyanine.

Sulfonated copper phthalocyanine can significantly improve the rheological properties of carbon black pigments when applied in conjunction with polymeric dispersants. However, sulfonated copper phthalocyanine has a very strong blue color and the addition of only small quantities can inopportunely shift the hue of the carbon black. Furthermore it is not sufficiently weather fast for employment in an automotive top coating, since the hue of such a coating can change quickly on exposure.

The state of the art offers various ways for the generation of black colors. However, no carbon black compositions are described that show universal pigment properties for an application in a choice of substrates, in particular topcoat automotive paint coatings.

SUMMARY OF THE INVENTION

Surprisingly, it has been found that novel and useful black pigment compositions can be prepared by mixing carbon black with particular organic pigment intermediates or pigment derivatives. Such black pigment compositions show a deep black color characteristic and outstanding rheological and gloss behavior when employed in high molecular weight materials, in particular in paints and inks.

DESCRIPTION OF THE PREFERRED EMBODIMENTS

Accordingly, the present invention provides black pigment compositions, comprising
(a) carbon black, and
(b) a compound of the formula

$(MO_3S)_m$-Q-$[(CH_2)_k$—$X]_n$  (I), wherein
Q is a pigment or pigment intermediate radical selected from the group consisting of anthraquinone, perinone, perylene, diketopyrrolopyrrole, thioindigo, iminoisoindoline, iminoisoindolinone, quinacridone, 6,13-dihydroquinacridone, flavanthrone, dioxazine, indanthrone, anthrapyrimidine and quinophthalone,
X is a cyclo hetero aliphatic group or a hetero aromatic group with at least one 5 or 6 atom ring,
M is hydrogen, a metal cation or nitrogen cation,
k is 0 or 1, and
m and n are each independently of the other from 0 to 4, wherein m and n are not equal to zero simultaneously.

Carbon black pigments which come into consideration as component (a) are, for example, lamp or vegetable black, C.I. Pigment Black 6; bone or ivory black, C.I. Pigment Black 9; or furnace or channel black, C.I. Pigment Black 7; preferably C.I. Pigment Black 7.

Generally, the carbon black is in a granulated or preferably a powder form of a high specific surface area in the range of at least 50 m²/g, preferably 100 to 600 m²/g and especially 150 to 600 m²/g as measured by the BET method. Such carbon black is known and manufactured in large quantities.

In a preferred embodiment of the present invention Q is a pigment or pigment intermediate radical selected from the group consisting of anthraquinone, perinone, perylene, diketopyrrolopyrrole, iminoisoindolinone, iminoisoindoline, 6,13-dihydroquinacridone, quinacridone, dioxazine, flavanthrone or indanthrone.

In a particular preferred embodiment of the present invention Q is a pigment or pigment intermediate radical selected from the group consisting of 6,13-dihydroquinacridones of formula

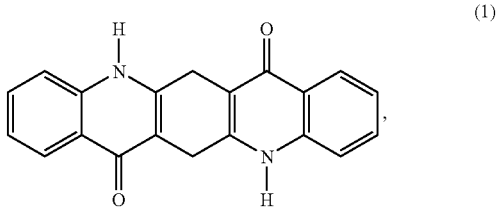

quinacridones of formula

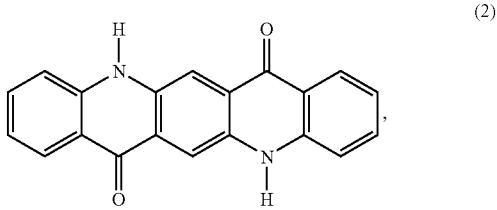

and indanthrones of formula

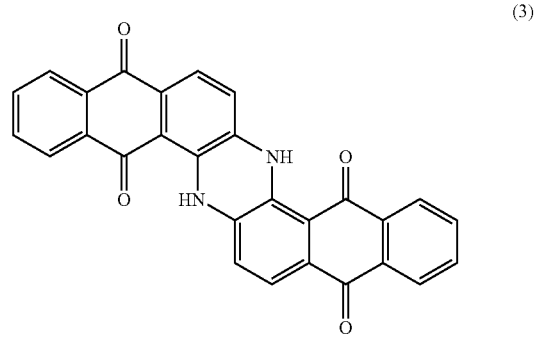

where the fused aryl rings may bear further substituents.
Especially Q is the radical of a 6,13-dihydroquinacridone of formula (1) or quinacridone of formula (2).

Cyclo-hetero aliphatic groups X with at least one 5 or 6 atom ring are, for example, 3-pyrroline, pyrrolidine, imidazolidine, piperidine, piperazine, morpholine, indoline, barbituric acid, hydantoin, xanthine, melamine, phthalimido or benzosulfimido, preferably phthalimido or benzosulfimido.

Hetero aromatic groups with at least one 5 or 6 atom ring are, for example, pyrrole, furane, thiophene, oxazole, thiazole, imidazole, pyrazole, pyridine, pyrazine, pyrimidine, pyridazine, purine, indole, isoindole, quinoline, isoquinoline, carbazole, phenothiazine, benzothiazole, benzimidazole or benzimidazolone, preferably oxazole, thiazole, imidazole, pyrazole, benzothiazole or benzimidazole, especially imidazole or pyrazole.

Especially preferred examples of a cyclohetero aliphatic group or a hetero aromatic group with at least one 5 or 6 atom ring linked to Q are an imidazole of formula (X-1)

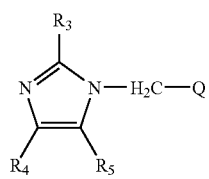

(X-1)

wherein $R_3$, $R_4$ and $R_5$ are, each independently of the other, hydrogen, chlorine, bromine, fluorine, $C_1$–$C_6$alkyl, $C_1$–$C_6$alkoxy or an isocyclic or heterocyclic aromatic radical;

a pyrazole of formula (X-2)

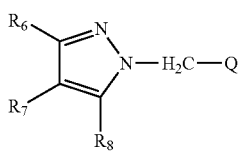

(X-2)

wherein $R_6$, $R_7$ and $R_8$ are, each independently of the other, hydrogen, chlorine, bromine, fluorine, $C_1$–$C_6$alkyl, $C_1$–$C_6$alkoxy or an isocyclic or heterocyclic aromatic radical;

a phthalimide of formula (X-3)

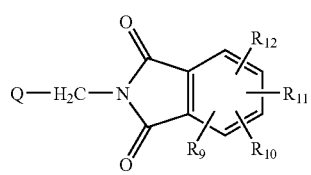

(X-3)

wherein $R_9$, $R_{10}$, $R_{11}$ and $R_{12}$ are, each independently of the other, hydrogen, chlorine, bromine, fluorine, $C_1$–$C_6$alkyl, $C_1$–$C_6$alkoxy or an isocyclic or heterocyclic aromatic radical;

a compound of formula (X-4)

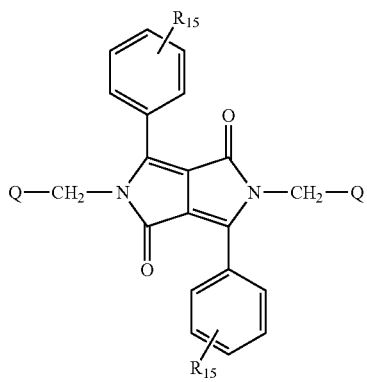

(X-4)

wherein $R_{15}$ is hydrogen, chlorine, bromine, fluorine, $C_1$–$C_6$alkyl, $C_1$–$C_6$alkoxy, phenyl, di-$C_1$–$C_6$alkylamino, $C_1$–$C_6$alkylthio, phenylthio or phenoxy; and an imidazole of the formula (X-5)

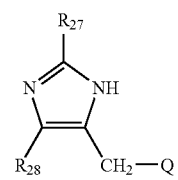

(X-5)

wherein $R_{27}$ and $R_{28}$ are, each independently of the other, hydrogen, chlorine, bromine, fluorine, $C_1$–$C_6$alkyl, $C_1$–$C_6$alkoxy or an isocyclic or heterocyclic aromatic radical.

The above exemplified cyclo-hetero aliphatic or hetero aromatic groups can optionally be substituted with one or more radicals selected from the group consisting of halogen, $C_1$–$C_6$alkyl, $C_1$–$C_6$alkoxy, $C_6$–$C_{10}$aryl, $C_7$–$C_{16}$aralkyl, $C_5$–$C_7$cycloalkyl, cyan hydroxyl and amino.

As $C_1$–$C_6$alkyl radicals there come into consideration straight-chained or branched radicals, for example, methyl, ethyl, n-propyl, iso-propyl, n-butyl, iso-butyl, sec-butyl and tert-butyl, n-pentyl, iso-pentyl and n-hexyl, preferably methyl and ethyl.

As $C_1$–$C_6$alkoxy radicals there come into consideration straight-chained or branched radicals, for example, methoxy, ethoxy, n-propoxy, isopropoxy, n-butoxy, sec-butoxy, tert-butoxy, isobutoxy, n-pentyloxy, iso-pentyloxy and n-hexyloxy, preferably methoxy and ethoxy.

As $C_6$–$C_{10}$aryl radicals there come into consideration, for example, phenyl, 1-naphthyl and 2-naphthyl which are unsubstituted or substituted by, for example, $C_1$–$C_4$alkyl, $C_1$–$C_4$alkoxy, cyano, nitro or halogen, such as fluoro, chloro or bromo.

As $C_7$–$C_{16}$aralkyl radicals there come into consideration, for example, benzyl, phenethyl and naphthylmethyl, preferably benzyl, which are unsubstituted or substituted by, for example, $C_1$–$C_4$alkyl, $C_1$–$C_4$alkoxy, cyano, nitro or halogen, such as fluoro, chloro or bromo.

As $C_5$–$C_7$cycloalkyl radicals there come into consideration, for example, cyclopentyl, cyclohexyl and cycloheptyl, preferably cyclohexyl, which are unsubstituted or substituted by, for example, $C_1$–$C_4$alkyl.

The cyclo-hetero aliphatic or hetero aromatic group X can be bonded to the radical Q, or to the methylene bridge, either directly or, for example, via an oxygen, sulfur or nitrogen atom, or X is bonded to the radical Q, or to the methylene bridge, by a nitrogen atom being part of the cyclo-hetero aliphatic or hetero aromatic ring. Preferably X is bonded to the radical Q or to the methylene bridge by a nitrogen atom which is part of the cyclo-hetero aliphatic or hetero aromatic ring.

In a preferred embodiment of the present invention X is a radical selected from the group consisting of imidazolyl, 3,5-dimethylpyrazol-1-yl-, phthalimido and benzosulfimido.

M as a nitrogen cation radical is, for example, represented by the formula $N^+(R)_4$, wherein each R independently of the other is hydrogen, $C_7$–$C_{16}$aralkyl, $C_1$–$C_{18}$alkyl or phenyl which is unsubstituted or substituted by $C_1$–$C_{18}$alkyl.

Examples of nitrogen cations are:
unsubstituted ammonium,
mono-, di-, tri- or tetra-$C_{1-4}$alkylammonium, such as methylammonium, ethylammonium, 3-propylammonium, isopropylammonium, butylammonium, sec-butylammonium, isobutylammonium, 1,2-dimethylpropylammonium or 2-ethylhexylammonium, dimethylammonium, diethylammonium, dipropylammonium, diisopropylammonium, dibutylammonium, diisobutylammonium, di-sec-butylammonium, di-2-ethylhexylammonium, N-methyl-n-butylammonium or N-ethyl-n-butylammonium, trimethylammonium, triethylammonium, tripropylammonium, tributylammonium, N,N-dimethylethylammonium, N,N-dimethylisopropylammonium, N,N-dimethylbenzylammonium or trimethylcetylammonium (trimethylhexadecylammonium), tributylbenzylammonium,
mono-, di-, tri- or tetra-$C_{8-16}$alkylammonium, such as

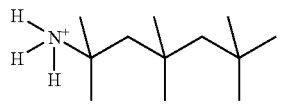

(notional representation of the ammonium cation of Primene 81R®),
$C_{1-4}$alkoxy-$C_{1-4}$alkylammonium, such as 2-methoxyethylammonium, bis(2-methoxyethyl)-ammonium, 3-methoxypropylammonium or ethoxypropylammonium,
mono-, di- or tri-(hydroxy-$C_{1-4}$alkyl)ammonium, such as mono-, di- or tri-ethanolammonium, mono-, di- or tri-isopropanolammonium, N-methyl- or N,N-dimethyl-ethanolammonium, -propanolammonium or -isopropanolammonium, N-methyl-diethanolammonium, -dipropanolammonium or -diisopropylammonium, N-ethyl-diethanolammonium, -dipropanolammonium or -diisopropylammonium, N-propyl-diethanolammonium, -dipropanolammonium or -diisopropylammonium, Polyammonium cations, especially diammonium cations, are likewise suitable. Preferred diammonium cations are derived from the following amines: 1,2-diaminoethane, 1,2-diamino-1-methylethane, 1,2-diamino-1,2-dimethylethane, 1,2-diamino-1,1-dimethylethane, 1,2-diaminopropane, 1,3-diaminopropane, 1,3-diamino-2-hydroxypropane, N-methyl-1,2-diaminoethane, 1,4-diazacyclohexane 1,2-diamino-1,1-dimethylethane, 2,3-diaminobutane, 1,4-diaminobutane, N-hydroxyethyl-1,2-diaminoethane, 1-ethyl-1,3-diaminopropane, 2,2-dimethyl-1,3-diaminopropane, 1,5-diaminopentane, 2-methyl-1,5-diaminopentane, 2,3-diamino-2,3-dimethylbutane, N-2-aminoethylmorpholine, 1,6-diaminohexane, 1,6-diamino-2,2,4-trimethylhexane, N,N-dihydroxyethyl-1,2-diaminoethane, N,N-dimethyl-1,2-diaminoethane, 4,9-dioxa-1,12-diaminododecane, 1,2-diaminocyclohexane, 1,3-diamino-4-methylcyclohexane, 1,2-diaminocyclohexane, 1-amino-2-aminomethyl-2-methyl-4,4-dimethylcyclohexane, 1,3-diaminomethylcyclohexane, N-2-aminoethylpiperazine, 1,1-di(4-aminocyclohexyl)methane, 1,1-di(4-aminophenyl)methane, N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methyl-heptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethylbutyl)-N'-phenyl-p-phenylenediamine, N-(1-methyl-heptyl)-N'-phenyl-p-phenylenediamine, N-cyclohexyl-N'-phenyl-p-phenylendiamine and N,N'-dimethyl-N,N'-di-sec-butyl-p-phenylenediamine.

Especially preferred examples of the quaternary nitrogen cation are ammonium, trimethylcetylammonium, tributylbenzylammonium.

As $C_7$–$C_{16}$aralkyl radicals there come into consideration, for example, the radicals indicated above.

As $C_1$–$C_{18}$alkyl radicals there come into consideration straight-chained or branched radicals, for example, methyl, ethyl, n-propyl, iso-propyl, n-butyl, iso-butyl, sec-butyl and tert-butyl, n-pentyl, iso-pentyl, n-hexyl, n-heptyl, n-octyl, n-nonyl, n-decyl, n-undecyl, n-dodecyl, n-tetradecyl, n-hexadecyl and n-octadecyl.

M as a metal cation is, for example, a mono-, di- or trivalent metal cation, such as sodium, potassium, magnesium, calcium, strontium, barium, aluminum and zinc, preferably an alkali metal, an alkaline earth metal, zinc or aluminum cation.

In a preferred embodiment M is hydrogen, a mono-, di- or trivalent metal cation or nitrogen cation, especially hydrogen, an alkali metal, an alkaline earth metal, zinc or aluminum cation, in particular hydrogen, a sodium, calcium or aluminium cation, and most preferably an aluminium cation Preferably k is the number 1.

Preferably the sum of m and n is from 0.2 to 4.

In an interesting embodiment of the present invention component (b) is a compound of the formula

(Ia), wherein

Q is a pigment or pigment intermediate radical selected from the group of quinacridone and 6,13-dihydroquinacridone, X is a radical selected from the group of imidazolyl, 3,5-dimethylpyrazol-1-yl-, phthalimido and benzo sulfimido, k is 1, and n is 1 or 2.

In another interesting embodiment of the present invention component (b) is a compound of the formula

(Ib), wherein

Q is a pigment or pigment intermediate radical selected from the group of quinacridone and indanthrone, M is a mono-, di- or trivalent metal cation or ammonium cation, and m is from 0.5 to 2, preferably from 0.8 to 1.1.

The nitrogen cation is $NR_4+$ wherein R is selected from the group consisting of $C_1$–$C_{25}$ alkyl, aryl, and alkyl group substituted aryl.

M in the compound of formula (1b) has the preferred meanings given above.

The radical Q in the compound of formula (1b) is preferably unsubstituted, unsubstituted meaning that there is no substituent other than hydrogen. However, blue-colored, substituted, sulfonated indanthrones and red, magenta or violet colored, substituted quinacridones are also effective in the inventive compositions. Thus, certain substituted indanthrones or quinacridones, especially those substituted in the phenyl rings by chlorine, bromine or $C_1$–$C_4$alkyl, such as methyl, can be used as component (b) of the inventive compositions.

Quinacridones and indanthrones are known as pigments. The sulfonated quinacridones and indanthrones utilized as component (b) are known as dyestuffs and as dyestuff intermediates and can be prepared by known methods, for example, by sulfonating the quinacridone or indanthrone by sulfonation procedures known in the art.

The pigment intermediate employed as component (b) preferably is a 6,13-dihydro-quinacridone derivative as described for example in U.S. Pat. No. 6,225,472.

Furthermore, quinacridone derivatives such as aromatic sulfonic acid methyl quinacridone derivatives as described in U.S. Pat. No. 6,264,733, benzothiazolyl or benzimidazolyl quinacridone derivative described in U.S. Pat. No. 5,868,828; and particularly the pyrazolyl methyl quinacridone derivatives as described in U.S. Pat. No. 5,334,727 are also suitable as a component (b), alone or in mixture with the above mentioned pigment derivatives of formula (Ib).

In general, the compositions contain from 50 to 95%, preferably 70 to 90%, especially 75 to 85% by weight of carbon black and from 5 to 50%, preferably 10 to 30%, especially 15 to 25% by weight of the compound of formula (I) as given above, based on the total weight of carbon black and the compound of formula (I).

The compositions of the present invention are prepared by conventional methods, for example, by mixing the individual components in the desired ratio, preferably by dry mixing the corresponding components (a) and (b).

The dry mixing can be executed in any suitable equipment such as a closed container which is rolled on a roller gear or shaken on a shaker. Suitable blenders also include the TURBULA mixer from W. Bachofen, Basel, Switzerland, or the P-K TWIN-SHELL INTENSIFIER BLENDER from Patterson-Kelley Division, East Stroudsburg, Pa., or other vertical or horizontal commercially available blenders.

The inventive pigment compositions are "uniform blends" of the carbon black and organic pigment derivative, a uniform blend being a physical mixture of the carbon black and pigment derivative wherein the pigment derivative is evenly distributed in the carbon black.

For the preparation of the inventive carbon black compositions having the desirable outstanding pigment properties it is preferred that component (b) is in a dry powder form, which can be easily and effectively blended with a small particle size carbon black, where the particle size has a surface area of about 50 $m^2$/g or greater. Thus, the preparation and composition of the dry powder form of component (b) is one embodiment of the present invention.

Typically the compound of formula (I) is prepared by reaction in concentrated sulfuric acid followed by precipitation in water or ice water. The resulting suspension is filtered, washed to a pH of 4.5 to 7.5 and dried.

Suitable drying equipment is for example spinflash-, luwa-, venuleth- or tray dryer. The resulting product is micro pulverized, for example with a hammer mill, or air-jet milled. Or the washed aqueous presscake can be reslurried in water followed by spray drying.

To improve the dispersibility behavior of the compound of formula (I) a texture-improving agent is preferably incorporated during its synthesis or more preferably after its preparation into the aqueous acidic slurry prior to the filtration, or it can be mixed into the aqueous washed presscake, in an amount of from 0.05 to 20%, preferably 1 to 10% by weight, based on the weight of the compound of formula (I).

Texture-improving agents are especially useful as an additional component that improves the properties of the inventive pigment derivative. Suitable texture-improving agents include fatty acids having at least 12 carbon atoms, and amides, esters or salts of fatty acids. Typical texture-improving agents are selected from the group consisting of fatty acids having at least 12 carbon atoms, fatty acid amides having at least 12 carbon atoms, fatty acid esters having at least 12 carbon atoms, salts of a fatty acid having at least 12 carbon atoms and fatty amines having at least 12 carbon atoms, fatty alcohols having at least 12 carbon atoms, ethoxylated fatty alcohols having at least 12 carbon atoms, polyols, glycerol mono stearates, polyvinylalcohols, polyvinylpyrrolidones, epoxidized soy bean oils, waxes, resin acids and resin acid salts.

Furthermore it is possible to add other colorants like dyes, organic or inorganic pigments or effect pigments or additives such as surfactants, antifoaming agents, inorganic fillers such as talc or mica, UV-absorber, light stabilizers like the HALS before, during or after the isolation process of the pigment derivative. The amount of such colorants or additives is 0 to 40 weight percent, preferably 0.1 to 20% by weight, based on the amount of the compound of formula (I).

Thus, the present invention relates to a process for the preparation of new strongly black pigment compositions which offer the possibility of the creation of new color shades when applied in mixture with other pigments, for example effect pigments.

The present black pigment composition is suitable as coloring matter for inorganic or organic substrates. It is highly suitable for coloring high molecular weight materials which can be processed to fibers, cast and molded articles or which are used in ink and coating compositions such as solvent or water based coatings, which are conventionally employed in the automobile industry, especially in acrylic/melamine resin, alkyd/melamine resin or thermoplastic acrylic resin systems, as well as in powder coatings and UV/EB cured coating systems.

Thus, the high molecular weight organic material is preferably an industrial paint, automotive paint, ink, powder coating, UV/EB cured coating or ink.

Suitable high molecular weight organic materials include thermoplastics, thermoset plastics or elastomers, natural resins or casein for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic polymers such as polyacrylates, polymethacrylates or polyacrylonitrile; rubber; silicone polymers; phenol/formaldehyde resins; melamine/formaldehyde resins; urea/formaldehyde resins; epoxy resins; styrene butadiene rubber; acrylonitrile-butadiene rubber or chloroprene rubber; singly or in mixtures.

Generally, the inventive black pigment composition is used in an effective pigmenting amount, for example, of 0.01 to 30% by weight, preferably 0.1 to 10% by weight, based on the weight of the high molecular weight organic material to be pigmented. Thus, the present invention also relates to a pigmented plastic composition which comprises a plastic material, and an effective pigmenting amount of a black pigment composition prepared according to a process of the present invention, and to a process for preparing said pigmented coating and plastic compositions.

Such products show outstanding pigment properties and, due to their unique black color, offer new styling opportunities. Due to their outstanding pigment properties, such as excellent dispersibility behavior, weatherability, high heat stability, excellent rheological properties, high color strength, high gloss behavior and jet ness as well as migration, bleed and over spraying fastness properties, they can be used for a variety of applications.

Without limiting this invention to any particular theory, it is believed that the inventive component (b) can be absorbed onto the carbon black particles during the dispersion step. It therefore prevents flocculation and thus increases the wetability and compatibility to the polymeric binder system.

To obtain different shades, it is also possible to add inorganic or polymeric fillers or other chromophoric components such as organic or inorganic pigments such as white, colored, effect, fluorescent or phosphorescent pigments, in any amount, to the high molecular weight organic compounds, in addition to the black pigment compositions of this invention.

The high molecular weight organic materials are pigmented with the pigments of the present invention by mixing the pigments, if desired in the form of a masterbatch, into substrates using high shear techniques including roll mills or a mixing or grinding apparatus. The pigmented material is then brought into the desired final form by known methods, such as calendaring, pressing, extruding, brushing, casting or injection molding.

Although the new black pigment compositions show good light and heat stability, it can be advantageous to apply the present compositions in the presence of commonly known and commercially available antioxidants, UV absorbers, light stabilizers, processing agents and so forth.

For pigmenting coatings, varnishes and printing inks, the high molecular weight organic materials and the inventive pigmentary compositions, together with optional additives such as fillers, other pigments, siccatives, light- or UV-stabilizers, are finely dispersed in a common organic solvent or mixture of solvents including water. The procedure may be such that the individual components by themselves, or also several jointly, are dispersed or dissolved in the solvent and subsequently all the components are mixed.

The inventive black pigment compositions have good rheological properties, and are particularly suitable for preparing aqueous and solvent based coatings conventionally employed in the ink-, industrial paint- or automotive industry, especially in acrylic/melamine resin, alkyd/melamine resin or thermoplastic acrylic resin systems, as well as in powder coatings and UV/EB cured coating systems. They can advantageously be incorporated in paint system at a higher pigment loading as compared to the currently available carbon black pigments.

Due to their outstanding heat stability the inventive black pigment compositions are particularly appropriate for coloring thermoplastics including polypropylene, polyethylene, soft, medium hard and hard polyvinyl chloride, ABS, PES and nylon. For example in soft and medium hard polyvinyl chloride very attractive, black, migration resistant colorations can be generated.

The colorations obtained show unique reflection spectra and for example in plastics, filaments, have good all-round fastness properties such as high migration resistance, heat and light stability and weathering behavior.

The black pigment compositions of this invention are also suitable for use as colorants for paper such as security paper, solid or liquid polymeric material, mineral oil, leather, inorganic materials, seeds, and in cosmetics.

The following examples illustrate various embodiments of the invention, but the scope of the invention is not limited thereto. In the examples, all parts are by weight unless otherwise indicated. The coloristic data are obtained utilizing a CS-5 CHROMA SENSOR spectrophotometer. The surface areas are measured by the BET method.

The following Examples illustrate the invention in more detail. They are not to be construed as limiting the instant invention in any manner whatsoever. The invention is declared to cover all changes and modifications of the specific examples that do not constitute a departure from the spirit and scope of the invention.

EXAMPLE 1

100 grams quinacridone mono sulfonic acid aluminum salt is prepared following Example II, U.S. Pat. No. 3,386,843; however, instead of direct isolation in conventional fashion as described in Example II, 4 grams 1,2-dodecanediol are added, the aqueous suspension is stirred for 1 hour at 70° C., cooled to 40 to 50° C. and filtered. The presscake is washed with water and dried. The dried 1,2-dodecanediol treated presscake is micro pulverized on a BANTAM micro pulverizer using a 0.027 inch screen and 14000 RPM rotating speed yielding a powdery quinacridone mono sulfonic acid aluminum salt.

EXAMPLE 2

Starting from quinacridone crude a 3,5-dimethylpyrazol-1-methyl quinacridone derivative is prepared following the procedure of Example 1 in U.S. Pat. No. 5,334,727. Instead of drying the presscake, the presscake is reslurried in water in the presence of 4 percent by weight of 1,2-dodecanediol and stirred for 1 hour at 70° C. followed by filtering at 40 to 50° C. The dried 1,2-dodecanediol treated presscake is micro pulverized on a BANTAM micro pulverizer using a 0.027 inch screen at 14000 RPM rotating speed yielding a powdery 3,5-dimethylpyrazol-1-methyl quinacridone derivative.

EXAMPLE 3

Into a beaker equipped with a stirrer, a solution of 15 g X-Dresinate from HERCULES in 200 ml water is added, followed by 543 g of an aqueous presscake containing 75 grams 3,5-dimethylpyrazol-1-methyl quinacridone derivative and 487 g aqueous presscake containing 75 g quinacridone mono sulfonic acid. The mixture is stirred up and the resulting suspension is stirred for 1 hour at 30 to 40° C. The pH of the alkaline suspension is adjusted to 4 to 5 by the addition of acid, precipitating the resin. The red suspension is filtered. The press cake is washed with water and dried.

The dried presscake is micro pulverized on a BANTAM micro pulverizer using a 0.027 inch screen at 14000 RPM rotating speed, yielding a powdery resinated quinacridone mono sulfonic acid aluminum salt/3,5-dimethylpyrazol-1-methyl quinacridone mixture.

EXAMPLE 4

An aqueous presscake containing 50 g indanthrone sulfonic acid is reslurried in water in the presence of 2 g lauric acid. The suspension is stirred for 1 hour at 60 to 70° C. then filtered at 30–40° C. The presscake is washed with water and dried followed by micro pulverization on a BANTAM micro pulverizer using a 0.027 inch screen at 14000 RPM rotating speed yielding a powdery lauric acid treated indanthrone sulfonic acid.

EXAMPLE 5

An aqueous presscake containing 50 g o-benzo sulfimido methyl 6,13-dihydroquinacridone, which was prepared according to U.S. Pat. No. 6,225,472 B1, is reslurried in water in the presence of 2 g 1,2-dodecandiol. The suspension is stirred for 1 hour at 60 to 70° C. then filtered at 30–40° C. The presscake is washed with water and dried followed by micro pulverization on a BANTAM micro pulverizer using a 0.027 inch screen at 14000 RPM rotating speed yielding a powdery 1,2-dodecandiol treated o-benzo sulfimido methyl 6,13-dihydroquinacridone.

EXAMPLE 6

40 g Color Black FW 200, C.I. Pigment Black 7, from DEGUSSA and 10 g quinacridone mono sulfonic acid aluminum salt as prepared according to Example 1 are added into a 18 oz flask and blended together by rolling the flask on a roller gear for 2 hours to form a uniform blend. The resulting dark black pigment composition produces a strongly weather fast black colored coloration when applied in paints or plastics. Surprisingly, the inventive black pigment composition shows low viscosity, an excellent gloss, high jetness and outstanding rheological behavior when applied in paints. Additionally, it shows excellent heat stability when applied in high performance thermoplastics.

EXAMPLE 7

Example 6 is repeated using instead of quinacridone mono sulfonic acid aluminum salt the 3,5-dimethylpyrazol-1-methyl quinacridone derivative as prepared according to Example 2, yielding a black pigment composition of similar good pigment properties.

EXAMPLE 8

Example 6 is repeated using instead of quinacridone mono sulfonic acid aluminum salt the powdery resinated quinacridone mono sulfonic acid aluminum salt/3,5-dimethylpyrazol-1-methyl quinacridone mixture as prepared according to Example 3, yielding a black pigment composition of similar good pigment properties.

EXAMPLE 9

Example 6 is repeated using instead of quinacridone mono sulfonic acid aluminum salt the powdery lauric acid treated indanthrone sulfonic acid as prepared according to Example 4, yielding a black pigment composition of similar good pigment properties.

EXAMPLE 10

Example 6 is repeated using instead of quinacridone mono sulfonic acid aluminum salt the powdery 1,2-dodecandiol treated o-benzo sulfimido methyl 6,13-dihydroquinacridone as prepared according to Example 5, yielding a black pigment composition of similar good pigment properties.

EXAMPLE 11

Example 10 is repeated using instead of Color Black FW 200, (C.I. Pigment Black 7 from DEGUSSA), 40 g Monarch Carbon Black 4750, (C.I. Pigment Black 7 from CABOT Corporation), yielding a black pigment composition of outstanding pigment properties.

EXAMPLE 12

Example 6 is repeated using instead of Color Black FW 200, 40 g Monarch Carbon Black 4750, yielding a black pigment composition of outstanding pigment properties.

EXAMPLE 13

This example shows the incorporation of the inventive pigment black into an automotive solvent-based paint system.

Mill Base Formulation

A pint jar is charged with 30.0 grams high solids acrylic copolymer resin (68% solids) from DUPONT, 6.55 grams acrylic A-B dispersant resin consisting of (55% solids) from DUPONT, and 71.45 grams Solvesso 100 from American Chemical. 12 grams black pigment composition of Example 12 and 240 grams of glass beads are added. The mixture in the jar is shaken on a Skandex shaker for 4 hours. The black "mill base" contains 10.0% pigment with a pigment/binder ratio of 0.5 and a solids content of 30%.

Masstone Color for Spraying a Panel 82.6 grams of the above millbase, 39.7 grams of a polyester acrylic urethane based solution of 47.8% solids, 17.7 grams of a melamine resin based solution (both solutions are from DUPONT) are mixed and diluted with a solvent mixture comprising 76 parts xylene, 21 parts butanol and 3 parts methanol to a spray viscosity of 20–22 seconds as measured by a #2 Fisher Cup.

The resin/pigment dispersion is sprayed onto a panel twice at 1½ minute intervals as basecoat. After 2 minutes, the clearcoat resin is sprayed twice at 1½ minute intervals onto the basecoat. The sprayed panel is then flashed with air in a flash cabinet for 10 minutes and then "baked" in an oven at 265° F. (129° C.) for 30 minutes, yielding a black colored panel.

Metallic Dispersion

A quart can is charged with 405 grams aluminum paste (5245AR from Silberline), 315 grams non-aqueous dispersion resin and 180 grams acrylic urethane resin and stirred for 1 to 2 hours until lump free.

Metallic Color for Spraying Panel (80/20 AI)

64.4 grams black "mill base", 5.8 grams "metallic dispersion", 41.8 grams polyester acrylic urethane based solution and 13 grams melamine based solution are mixed. The viscosity is reduced to 20–22 seconds using a N2 Fisher device by a thinning solvent mixture of the following composition: 76 grams xylene, 21 grams butanol and 3 grams methanol. The resin/pigment dispersion is sprayed onto a panel twice at one minute intervals as basecoat. After 3 minutes, clearcoat resin is sprayed twice at one minute intervals onto the basecoat. The sprayed panel is then flashed with air in a flash cabinet for 10 minutes and then "baked" in an oven at 265° F. (130° C.) for 30 minutes, yielding a black metallic colored panel with excellent weatherability. A microscopic evaluation shows a homogeneous distribution of the pigment particles in the coating system.

Russet Mica Dispersion

The following ingredients are stirred together to provide a mica dispersion containing 27.9% pearlescent mica pigment and a total solid content of 69.1% solids:

251.1 grams of bright russet mica, EXTERIOR MEARLIN from The Mearl Corp., 315.0 grams of none aqueous dispersion resin, and 180.0 grams of acrylourethane resin.

Russet Mica Color for Spraying Paint

A 50/50 russet mica shade coating (for 25% pigment loading) is prepared by mixing the following ingredients:

| | |
|---|---|
| 50.3 grams | of the black "mill base" dispersion |
| 14.5 grams | of "russet mica dispersion" |
| 44.1 grams | of a polyester acrylic urethane based solution |
| 15.6 grams | of a melamine based solution |

The black pigment/pearlescent mica/resin dispersion, which has excellent rheological properties, is sprayed onto a primed panel 8 times (for complete hiding) at 1 minute intervals as basecoat. After 3 minutes, clear coat resin is sprayed twice at 1 minute intervals onto the basecoat. The sprayed panel is flashed with air in a flash cabinet for 10 minutes and then "baked" in an oven at 265° F. (130° C.). A black colored effect coating with excellent weatherability is obtained. The black coating shows high gloss and a reddish flop.

EXAMPLE 14

63.0 grams of polyvinyl chloride, 3.0 grams epoxidized soy bean oil, 2.0 grams of barium/cadmium heat stabilizer, 32.0 grams dioctyl phthalate and 1.0 gram of the black pigment composition prepared according to Example 7 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive black shade and has excellent fastness to heat, light and migration.

EXAMPLE 15

Five grams of the black pigment composition prepared according to Example 6, 2.65 grams CHIMASORB 944LD (hindered amine light stabilizer), 1.0 gram TINUVIN 328 (benzotriazole UV absorber) and 2.0 grams IRGANOX B-215 Blend (anti-oxidant), all available from Ciba Specialty Chemicals, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 200, 250 and 300° C. Homogeneously colored chips, which show a black color with practically no color differences, are obtained. They have an excellent light stability.

I claim:

1. A black pigment composition comprising
   (a) carbon black, and
   (b) a compound of the formula

   $$(MO_3S)_m\text{—}Q\text{-}[(CH_2)_k\text{—}X]_n \qquad (I),$$

wherein
   Q is a pigment or pigment intermediate radical selected from the group consisting of anthraquinone, perinone, perylene, diketopyrrolopyrrole, thioindigo, iminoisoindoline, iminoisoindolinone, quinacridone, 6,13-dihydroquinacridone, flavanthrone, dioxazine, indanthrone, anthrapyrimidine and quinophthalone,
   X is a cyclohetero aliphatic group or a hetero aromatic group with at least one 5 or 6 atom ring,
   M is hydrogen, a metal cation or nitrogen cation,
   k is 0 or 1, and
   m and n are each independently of the other from 0 to 4, wherein m and n are not simultaneously zero.

2. A black pigment composition according to claim 1, wherein
   the carbon black is selected from the group consisting of C.I. Pigment Black 6, C.I. Pigment Black 9 and C.I. Pigment Black 7.

3. A black pigment composition according to claim 1, wherein
   the carbon black is C.I. Pigment Black 7.

4. A black pigment composition according to claim 1, wherein
   the carbon black has a specific surface area of at least 50 m$^2$/g.

5. A black pigment composition according to claim 1, wherein
   the carbon black has a specific surface area of from 100 to 600 m$^2$/g.

6. A black pigment composition according to claim 1, wherein
   the carbon black has a specific surface area of from 150 to 600 m$^2$/g.

7. A black pigment composition according to claim 1, wherein
   Q is a pigment or pigment intermediate radical selected from the group consisting of 6,13-dihydroquinacridone, quinacridone and indanthrone.

8. A black pigment composition according to claim 1, wherein
   Q is a pigment or pigment intermediate radical selected from the group consisting of 6,13-dihydroquinacridone and quinacridone.

9. A black pigment composition according to claim 1, wherein
X is a radical selected from the group consisting of imidazolyl, 3,5-dimethylpyrazol-1-yl-, phthalimido and benzosulfimido.

10. A black pigment composition according to claim 1, wherein
M is hydrogen, a mono-, di- or trivalent metal cation or nitrogen cation.

11. A black pigment composition according to claim 1, wherein
M is hydrogen, an alkali metal, an alkaline earth metal, or a zinc or aluminum cation.

12. A black pigment composition according to claim 1, wherein
k is the number 1.

13. A black pigment composition according to claim 1, wherein
the sum of m and n is from 0.2 to 4.

14. A black pigment composition according to claim 1, wherein
component (b) is a compound of the formula

wherein
Q is a pigment or pigment intermediate radical selected from the group consisting of quinacridone and 6,13-dihydroquinacridone,
X is a radical selected from the group of imidazolyl, 3,5-dimethylpyrazol-1-yl-, phthalimido and benzo sulfimido,
k is 1, and
n is from 0.5 to 4.

15. A black pigment composition according to claim 1, wherein
component (b) is a compound of the formula

wherein
Q is a pigment or pigment intermediate radical selected from the group consisting of quinacridone and indanthrone,
M is a mono-, di- or trivalent metal cation or ammonium cation, and
m is from 0.5 to 2.

16. A black pigment composition according to claim 1, comprising
from 50 to 95% by weight of carbon black and from 5 to 50% by weight of the compound of formula (I), based on the total weight of carbon black and the compound of formula (I).

17. A black pigment composition according to claim 16, comprising
from 70 to 90% by weight of carbon black and from 10 to 30% by weight of the compound of formula (I), based on the total weight of carbon black and the compound of formula (I).

18. A black pigment composition according to claim 16, comprising
from 75 to 85% by weight of carbon black and from 15 to 25% by weight of the compound of formula (I), based on the total weight of carbon black and the compound of formula (I).

19. A black pigment composition according to claim 1, wherein
the compound of formula (I) contains 0.05 to 20% by weight of a texture-improving agent, based on the weight of the compound of formula (I).

20. A black pigment composition according to claim 19, wherein
the texture-improving agent is at least one compound selected from the group consisting of fatty acids having at least 12 carbon atoms, fatty acid amides having at least 12 carbon atoms, fatty acid esters having at least 12 carbon atoms, salts of a fatty acid having at least 12 carbon atoms and fatty amines having at least 12 carbon atoms, fatty alcohols having at least 12 carbon atoms, ethoxylated fatty alcohols having at least 12 carbon atoms, polyols, glycerol mono stearates, polyvinylalcohols, polyvinylpyrrolidones, epoxidized soy bean oils, waxes, resin acids and resin acid salts.

21. A process for the preparation of a black pigment composition according to claim 1 comprising
blending carbon black in a granulated or powdery form with a powder form of the compound of the formula (I) until a uniform blend is generated.

22. A process for coloring a solid or liquid material, comprising
incorporating into said material an effective pigmenting amount of a black pigment composition according to claim 1.

23. A process according to claim 22, wherein
the material is selected from the group consisting of a cellulose ether, cellulose ester, natural resin, synthetic polymer, rubber, casein, silicone or silicone resin and mixtures thereof.

24. A process according to claim 22, wherein
the material is an industrial paint, automotive paint, ink, powder coating, UV/EB cured coating or ink.

25. A process according to claim 22, wherein
the material is paper, security paper, leather, solid or liquid polymeric material, mineral oil, inorganic material, cosmetic material or seed.

26. A process for coloring a material, comprising
applying to said material a coating composition containing an effective pigmenting amount of a black pigment composition according to claim 1.

* * * * *